United States Patent [19]

Kaye

[11] Patent Number: 5,497,188
[45] Date of Patent: Mar. 5, 1996

[54] METHOD FOR VIRTUALIZING AN ENVIRONMENT

[76] Inventor: Perry Kaye, 6446 Lupton Dr., Dallas, Tex. 75225

[21] Appl. No.: 85,779

[22] Filed: Jul. 6, 1993

[51] Int. Cl.⁶ ..................................................... H04N 7/18
[52] U.S. Cl. ................................................. 348/36; 348/61
[58] Field of Search .................................... 348/36, 37, 38, 348/39, 40, 41, 42, 46, 50, 61, 121, 143, 148, 157, 373, 359, 345, 347, 348; 364/424.01, 424.02, 424.03, 443, 444

[56] References Cited

U.S. PATENT DOCUMENTS

| | | | |
|---|---|---|---|
| 3,689,695 | 9/1972 | Rosenfield et al. | 348/148 |
| 4,058,831 | 11/1977 | Smith | 348/47 |
| 4,672,435 | 6/1987 | Gluck | 348/39 |
| 4,709,265 | 11/1987 | Silverman et al. | 348/36 |
| 4,789,898 | 12/1988 | Zwirn et al. | 348/354 |
| 4,913,458 | 4/1990 | Hamilton | 348/148 |
| 4,956,714 | 9/1990 | Takanashi et al. | 348/345 |
| 4,977,323 | 12/1990 | Jehle | 250/332 |
| 5,014,126 | 10/1989 | Pritchard . | |
| 5,068,735 | 11/1991 | Tuchiya et al. | 354/412 |
| 5,081,530 | 1/1992 | Medina | 358/88 |
| 5,111,289 | 5/1992 | Lucas et al. | 358/108 |
| 5,113,253 | 11/1990 | Pritchard | 358/91 |
| 5,130,794 | 7/1992 | Ritchey | 358/87 |
| 5,138,459 | 8/1992 | Roberts et al. | 358/209 |
| 5,172,251 | 12/1992 | Benton et al. | 348/40 |
| 5,241,481 | 8/1993 | Olsen | 364/424.02 |
| 5,304,791 | 4/1994 | Migliaccio | 348/359 |
| 5,369,430 | 11/1994 | Kitamura | 348/345 |

Primary Examiner—Tommy P. Chin
Assistant Examiner—Bryan S. Tung
Attorney, Agent, or Firm—Ross, Clapp, Korn & Montgomery

[57] ABSTRACT

An apparatus for capturing optical information to virtualize an environment includes a platform, an essentially vertical positioning shaft mounted on the platform, a range finding mechanism for detecting the range of locations in real space in the environment, a camera, structurally connected to the shaft, a mechanism for rotating the camera relative to the platform, a mechanism for translationally moving the camera along the shaft and relative to the platform. The range finding mechanism measures the distance between the camera and an object in the environment, for focusing the camera. The range finding mechanism includes a laser generating device. The apparatus also includes a computer for tracking and controlling the mechanisms for translationally and rotationally moving the camera relative to the platform, for controlling the wheel motor to propel and position the platform in a desired location to achieve a useful camera perspective within the environment, and to store and process and reconcile the image in a data-base.

5 Claims, 4 Drawing Sheets

FIG.14    ENVIRONMENT TO VIRTUALIZE

METHOD FOR VIRTUALIZING AN ENVIRONMENT

BACKGROUND OF THE INVENTION

1. Field of the Invention

The present invention relates generally to the field of gathering and storing video and range information to create an interactive visual representation known as virtuality, and more specifically to a method of using a camera and platform assembly for capturing pixels at an ordered series of locations defined by the three principle geometric axes and over a full 360 degree environment for storage in a computer memory for use with a virtual reality program, the assembly including a video or digital camera including a range finder to gather information for focusing and zooming the video tube or charge coupled device (CCD) prior to taking a video image and to gather range information, a positioning shaft on which the camera is mounted, a stepper motor for incrementally rotating the shaft and camera over 360 degrees, a linear actuator for moving the camera vertically along the positioning shaft, and a platform on wheels to which the shaft is attached for horizontally varying the camera position to capture all dimensions of objects within the environment and a computer on the platform for tracking and guiding the camera by controlling the stepper motor and for sensing camera location, linear actuator and operation of the platform wheels to move the platform to the next taping location, and for reconciling video information with the three principle axes defining space, and to a method of gathering video information including the steps of measuring the distance and location of each object in the environment from the camera with the range finder, capturing one horizontal resolution unit of visual information of the environment with the video camera, rotationally moving the positioning shaft and camera relative to the platform to capture the next horizontal resolution unit until a 360 degree rotation is complete, then moving the camera translationally along the positioning shaft to the level of the next vertical resolution unit and again capturing the 360 degrees of horizontal resolution units, or alternatively capturing all vertical EPE's and then moving to the next horizontal EPE, and thereafter moving the platform to a new location within the environment to begin capturing more environmental picture elements, until all required video information is stored. Several methods for capturing EPE's in different orders and with different hardware are provided, and these methods are not to be construed as limited by any particular hardware described herein. Several camera enhancing configurations of lenses and CCD's are also provided which are considered inventive in their own right, and also serve as examples of how the inventive methods may be performed.

2. Description of the Prior Art

There have long been cameras and camera mounting structures for capturing optical information for various purposes. These cameras and mounting structures have failed to provide a complete assembly that is well suited for gathering the optical information needed for generating virtual reality images.

One such prior device is that of Medina, U.S. Pat. No. 5,081,530, issued on Jan. 14, 1992. Medina discloses a camera and range finder assembly which can gather three-dimensional optical information about objects in its environment from a single location, using a precisely timed beam of energy. The reflected energy of the beam is detected by the camera, is separated by phase and is timed to measure distance and three-dimensional characteristics of objects. The information may be used for stereoscopic viewing or for machine operations. A problem with Medina, when applied to gathering optical information for virtualizing, is that neither a complete system nor method is presented for gathering and processing pixels from all sides of all objects in the environment.

Roberts, U.S. Pat. No. 5,138,459, issued on Aug. 11, 1992, teaches an electronic still video camera and personal computer combination for providing operator selectable digital compression, in a selectable format, recordable on a standard diskette. A problem with Roberts is that no range information is captured and Roberts is not panoramic. Another problem is that means of gathering optical information from an environment completely and methodically are not provided. While Roberts might form part of a virtual reality camera system, it is only a possible system element and not a system in itself.

Lucas, U.S. Pat. No. 5,111,289, issued on May 5, 1992, reveals a video camera and vehicle mounting structure, and a remote microphone and signal transmission mechanism. The camera is intended primarily for mounting inside the windshield of a police vehicle to tape images of speeding or erratically driven cars. The microphone would be carried on the policeman and the signals transmitted to and simultaneously recorded on the video tape. A problem with Lucas when applied to virtual reality taping is once again that no range information is captured and no provision is made for rapidly and panoramically receiving optical information. Thus, capturing a virtual environment using the Lucas device would likely be prohibitively time consuming.

Tuchiya, U.S. Pat. No. 5,068,735, issued on Nov. 26, 1991, discloses a system for controlling the tilting, panning and lifting of a panning head on which a television camera is mounted. Tuchiya further teaches servo-mechanisms for controlling focusing and zooming of the television camera, all under the guidance of a computer. A problem with Tuchiya is that no range information is captured and images are not processed and stored in a memory. Another problem is that no means is provided for substantially increasing information gathering speed, such as simultaneous taping in several directions at once. Another problem is that Tuchiya provides no means for automatically changing camera location for quickly taping objects in an environment from several perspectives, necessary for virtualizing.

Ishikawa, U.S. Pat. No. 5,040,016, issued on Aug. 13, 1991, reveals a camera and an external computer device mounted on the camera for providing additional camera functions. These functions might include automatic focusing or determination of an exposure mode. A problem with Ishikawa, if used for virtualizing, is that no range information is captured and no provision is made for rapid and accurate camera positioning. Another problem is that no provision is made for rapid gathering and storage of optical information in the multiple directions and positions necessary for complete capturing of an environment.

Jehle, U.S. Pat. No. 4,977,323, issued on Dec. 11, 1990, discloses a 360 degree infrared surveillance system for military vessel detection and identification. The system includes a scanning head rotated on a turntable having optical and infrared detectors in a vertical linear array, amplifiers for each detector and light emitting diodes (LED's) for each detector channel. The light from the LED's is imaged onto photo-detectors whose output is amplified and fed to a corresponding LED. An optical rotator causes the image of their light to rotate. Problems with Jehle include that no range information or true color images are captured, no provision is made for incremental camera elevation adjustments, camera position change within an environment or for accurate range finding, which are all important to virtualizing.

U.S. Pat. No. 5,113,253 may also be relevant, but is not available because it was withdrawn.

Pritchard, U.S. Pat. No. 5,014,126, issued on Oct. 23, 1989 relating to a single camera auto-stereoscopic imaging system is also considered relevant to complete disclosure.

It is thus an object of the present invention to provide a virtual reality camera and mounting structure assembly which can automatically capture imagery over 360 degrees at high speed and at incremental elevations, to make virtualizing practical.

It is another object of the present invention to provide such an assembly which is guided, tracked and coordinated by a computer.

It is still another object of the present invention to provide such an assembly which directs a laser range finder through the camera lens or another lens that targets the laser at the video target, for maximum accuracy and minimal optical distortion.

It is finally an object of the present invention to provide such an assembly which is relatively simple and reliable in design and inexpensive to manufacture.

SUMMARY OF THE INVENTION

The present invention accomplishes the above-stated objectives, as well as others, as may be determined by a fair reading and interpretation of the entire specification.

An apparatus is provided for capturing optical and range information to virtualize an environment, including a platform, an essentially vertical positioning shaft mounted on the platform, a camera, structurally connected to the shaft, a mechanism for rotating the camera relative to the platform, a mechanism for translationally moving the camera along the shaft and relative to the platform. The apparatus may additionally include a range finding mechanism for measuring the distance between the camera and an object in the environment, for focusing the camera. The range finding mechanism preferably includes a laser generating device. The camera preferably includes a lens for receiving optical information and the laser generating device directs laser light through the lens or through a lens that can accurately target the pixel. The apparatus preferably additionally includes wheels on the platform on which the platform can roll, and a wheel motor for driving at least one of the wheels. The mechanism for translationally moving the camera along the shaft preferably includes a linear actuator. The mechanism for rotationally moving the camera relative to the platform preferably includes a stepper motor. The apparatus also preferably includes a computer for controlling the mechanisms for translationally and rotationally moving the camera relative to the platform, and for controlling the wheel motor to propel and position the platform in a desired location to achieve a useful camera perspective within the environment.

The computer preferably maintains and reconciles a database of range and video information, and uses the range and video information to calculate an optimal series of apparatus and lens positions from which to capture video information of the environment.

A camera is provided for virtual recording in conjunction with a range finding mechanism, including a mechanism for capturing optical information, a lens for gathering optical information, a directional mirror angled relative to the lens for directing the optical information within the camera, and a mechanism for changing the angle of the directional mirror relative to the lens, to direct the optical information to the range finding mechanism and then to the mechanism for capturing optical information. The mechanism for capturing optical information may be either a video tube or a charge coupled device or some other video imaging system. A second mirror may be provided for receiving optical information directly from the lens and directing the optical information to the directional mirror. Alternatively, there may be a CCD/camera for taking images and a separate range finder for taking range information.

The apparatus described above may include a camera including a block of charge coupled devices sequentially positioned for each charged couple device to receive optical information by a block moving motor. The camera may alternatively include a ring of charge coupled devices sequentially positioned for each charge coupled device to receive optical information by a ring rotating motor. The camera alternatively includes an annular mounting structure encircling the shaft containing a series of outwardly directed lenses and corresponding charge coupled devices around its circumference, for simultaneous panoramic capture of optical information, where the mechanism for moving the camera instead moves the annular mounting structure. The camera may alternatively include a 360 degree lens for capturing horizontal pixel rings of optical information. The camera alternatively again may include an annular mounting structure encircling the shaft for containing a series of outwardly directed lenses mounted around its circumference, a charge coupled device spaced apart from the annular mounting structure, and optical cables connected to the lenses and to the charge coupled device for transmitting optical information from each of the lenses to sections of the charge coupled device, for simultaneous capture of optical information, where the mechanism for moving the camera translationally relative to the platform instead moves the annular mounting structure. The camera may alternatively include many lenses mounted on the shaft, and several fiber optic cables extending one from each lens to a spaced apart charge coupled device. The camera may additionally include a fiber optic holder attached to the charge coupled device for securing the fiber optic cables.

The camera preferably includes a lens for receiving optical information and the laser generating device directs laser light through a lens other than the camera lens to a specific point in the environment at which a video image is to be taken. A device for gathering range information is always provided, and preferably includes a laser device. The camera preferably includes a camera lens, and the laser device preferably includes a laser lens. The camera lens and said laser lens may be separate lenses, or may be unified as a single lens.

A method is provided of gathering optical information using the above apparatus, including the steps of measuring the distance of each object in the environment from the camera with the range finding mechanism, using this information to focus and zoom the lenses, capturing optical information with the camera, rotationally moving the camera relative to the platform with the mechanism for rotationally moving the camera, to a series of different positions. The method may additionally include the step of moving the camera along the shaft with the mechanism for translationally moving the camera to a series of different locations. Another added step is that of moving the platform within the environment on the wheels with the motor.

A system is also provided for capturing optical information to virtualize an environment containing objects, including range finder means for gathering range location information over a 360 degree environment, camera means for gathering image information corresponding to the range location information, means for sorting and storing the range location information and the image information, means for virtualizing the range location information and the image information and for reconciling the objects, and computer means for directing systems operations, to sense the systems position and to process, manage and reconcile the range location information and image information.

A method of virtualizing is provided which includes the step of storing each pixel with its appropriate range information. Another method of virtualizing includes the steps of reconciling the pixels and range information by having the system separate the objects in the environment into distinct different objects, and using this information to decide what objects in the environment it needs to encircle, for intelligently virtualizing an environment without assistance. The method may additionally include the step of using a computer to determine the next location to which the apparatus platform should be moved, and the computer preferably also stores, processes and reconciles the image in a data-base.

The apparatus for capturing optical information in its broadest sense, includes a video gathering device. Where there is a charge coupled device, a fiber optic holder may be attached to the charge coupled device for securing the fiber optic cables. Several ranges may be detected simultaneously and then video image information captured which matches these ranges. The range and video information for a given location in real space may be captured essentially simultaneously.

Another general method of gathering optical information using the above described apparatus includes the steps of gathering range information in a 360 degree environment, gathering image information matching the range locations with video gathering means. This method may include the additional step of having the computer sort and store the range and image information. The method may also include the additional step of virtualizing the stored information and reconciling objects in the environment. The method may include the still additional step of directing systems operations, sensing the systems position, process, manage, and reconcile the range and image information.

A method of sectioning a video device to increase performances many fold includes the steps of sectioning a single video capturing device, such as a video tube or CCD, into separate and distinct image areas through the use of a special fiber-optic cable assembly and an ordered pair of fiber-optic cables, then attaching each of these fiber-optic cables, to a different lens. If the video device normally captured 30 full frames of information, this type of assembly would allow it to increase its number of frames captured by decreasing the frame image size. For example, by making a four-section video assembly you could simultaneously capture four different video images from four different locations and lenses. This method increases a 30 frames per second device to 120 frames per second. The frames are then one quarter the size of the original frame.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 1:
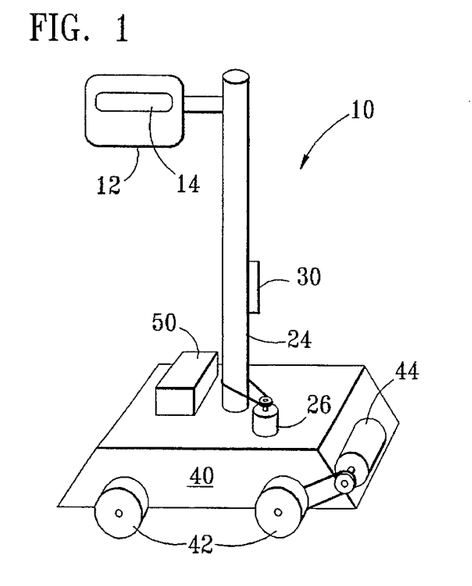
FIG. 1 is a perspective view of the inventive camera platform, vertical shaft and range finder assembly.

Referring to FIG. 1, a virtual reality camera and platform assembly 10 is disclosed. Assembly 10 captures pixels over a full 360 degree environment for storage in a computer memory for use with a virtual reality program. Assembly 10 includes a conventional panoramic video or digital camera 12 having a range finder 14 to gather information for focusing and zooming the video tube or charge coupled device (CCD) 16 prior to capturing a video image 20. Camera 12 is mounted on a vertical positioning shaft 24 and a stepper motor 26 incrementally rotates shaft 24 and camera 12 over 360 degrees. A linear actuator 30 is provided for moving camera 12 vertically along shaft 24. Shaft 24 is attached to the top of a platform 40 having wheels 42 driven by a wheel motor 44, for rolling to horizontally varied camera 12 positions to capture all dimensions of objects within the environment. A computer 50 is provided on platform 40 for tracking and guiding camera 12 by controlling motors 26 and 44. Computer 50 also controls linear actuator 30 and reconciles gathered video information with the three principle (X, Y and Z) axes defining real space.

Figure 2:
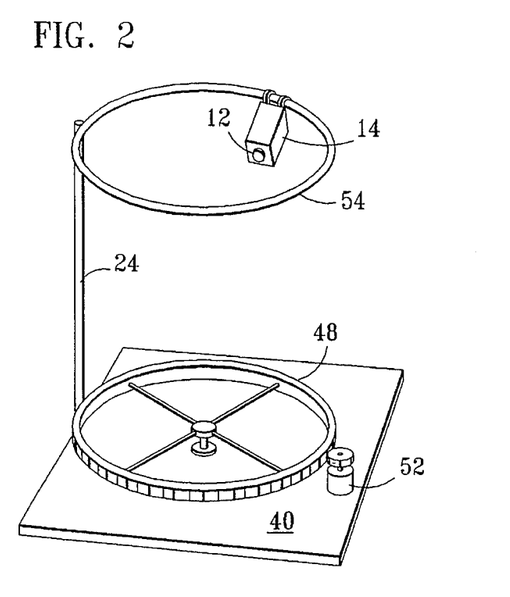
FIG. 2 is a perspective view of an alternative embodiment of the inventive platform and camera arrangement wherein the vertical shaft rotates on a ring gear and the camera is mounted on a hoop attached to the top of the shaft. Not shown is a non-rotating center platform on which a subject will rest when being virtualized.
Figure 3:
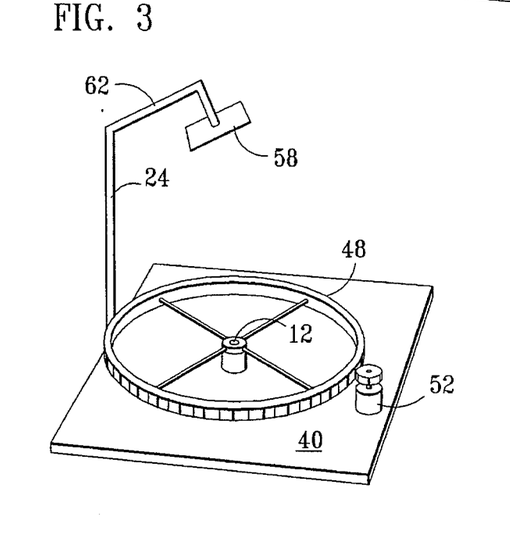
FIG. 3 is a perspective view of an embodiment similar to that of FIG. 2, except that a mirror is mounted atop the shaft for directing optical information down to a camera and range finder mounted on the platform within the ring gear.
Figure 4:
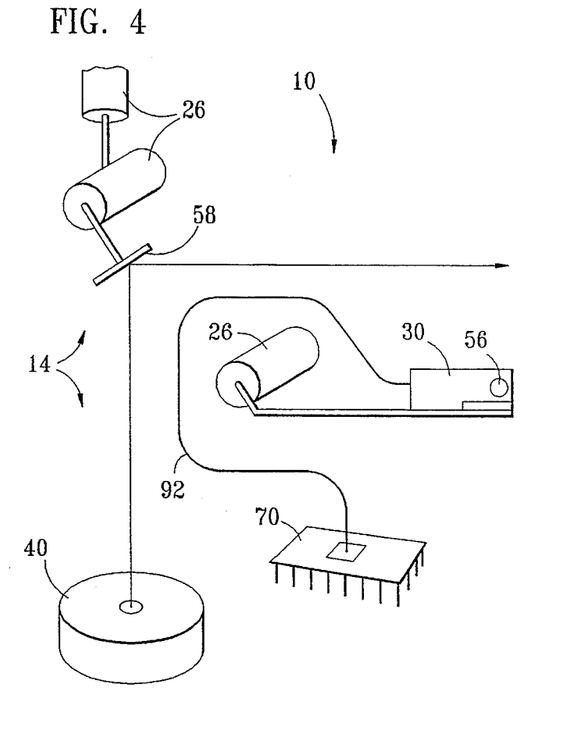
FIG. 4 is an alternative arrangement wherein the laser is directed vertically upward to a laser mirror, and the laser mirror and video lens are oriented by separate stepper motors controlled by the computer.

Alternatively, a wide ring gear 48 may be horizontally and rotatably mounted on platform 40, and rotated by a ring gear motor and pinion assembly 52. The operation of motor assembly 52 is controlled by computer 50. Shaft 24 is attached to the circumference of ring gear 48 and extends vertically upward. A horizontal mounting hoop 54 is attached to the top of shaft 24 and camera 12 is connected to hoop 54. See FIG. 2. Rotating ring gear 48 in turn rotates camera 12 to gather 360 degrees of video images. Alternatively, a mirror 58 and mirror support member 62 may be affixed to the top of shaft 24. See FIG. 3 Camera 12 is mounted on platform 40 in the middle of ring gear 48, and receives optical information reflected from the environment by mirror 58. Rotating ring gear 48 causes mirror 58 to reflect to camera 12 the video images around the full 360 degrees, and changing the angle of mirror 58 relative to platform 40 prepares mirror 58 for another 360 degree sweep. Another alternative is illustrated in FIG. 4, wherein a laser range finder 14 is contained within a platform 40 and directed vertically upward to a laser mirror 58. Laser mirror 58 is oriented and reoriented by a stepper motor 26 under the direction of a computer (not shown). Once range finder 14 has determined the range of a location in real space, a camera lens 56 is oriented with another stepper motor 26. The image from lens 56 is focused and zoomed by a linear actuator 30 and delivered to a CCD system 70 through an optical fiber 92.

Camera Enhancements

Figure 5:
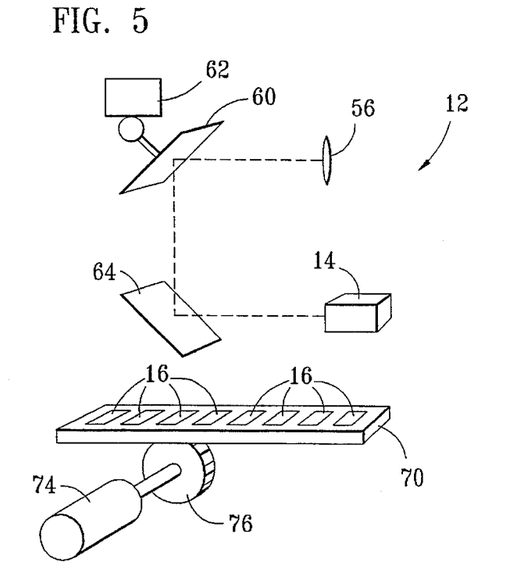
FIG. 5 is schematic of the arrangement of the lens, mirrors, linear CCD block and servo for one embodiment of the camera.
Figure 6:
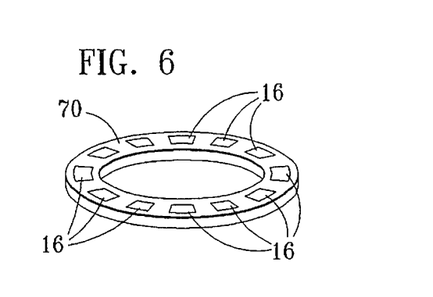
FIG. 6 is a perspective view of the annular CCD block alternative structure.

Camera 12 may include any of several inventive camera lens 56 and CCD 16 arrangements. Range finding is preferably accomplished with a laser projected through lens 56 for minimal error and distortion. The laser can alternatively be projected through a separate lens. Light is gathered through lens 56 and directed to a first mirror 60 angled relative to lens 56. See FIG. 5. A servo mirror positioning system 62 adjusts the angle of first mirror 60 as needed. The rays striking first mirror 60 are directed onto a laser/camera selection mirror 64 and from first mirror 60 to laser range finder 14, to gather distance information to focus and zoom lens 56. Then laser/camera selection mirror 64 rotates to direct image 20 onto a CCD 16. An array of CCD's 16 are preferably provided to increase camera 12 speed, and are contained on a movable CCD block 70. See FIG. 5. Block 70 may be linear, as shown in FIG. 5, or annular, as shown in FIG. 6. A CCD selection servo 74 rotates a CCD selection gear 76 which meshes with a rack (not shown) on block 70. Servo 74 thereby moves block 70 incrementally into a series of fixed positions to present a succession of CCD's 16 in the array, so that each CCD 16 gathers some of the video information.

Figure 7:
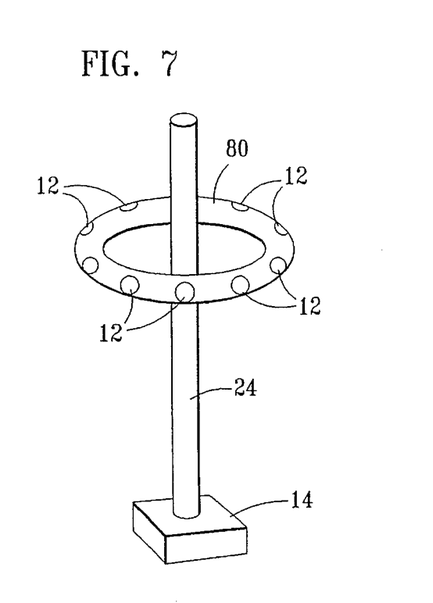
FIG. 7 is perspective view of the annular camera mounting structure encircling the vertical shaft, having a range finder at the base of the shaft.
Figure 8:
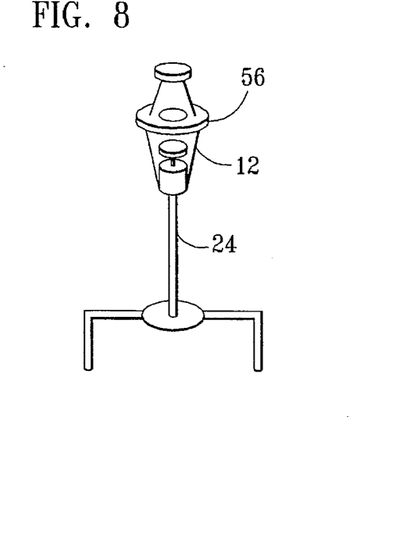
FIG. 8 is a perspective view of a camera having a 360 degree panoramic lens slidably connected to the vertical shaft.

Another camera 12 arrangement is to have a series of complete lens 56, CCD 16 and remaining camera 12 elements mounted perpendicular to a circular camera block 80. See FIG. 7. In this way, multiple pictures around a 360 degree circumference can be taken simultaneously, again for increased speed of capture. Block 80 is positioned around shaft 24 and can be raised or lowered as needed to capture a series of environmental picture elements (EPE's). Each EPE is made up of a digitalized picture and the X, Y, and Z coordinates of the element in real space. Alternatively, a single camera 12 with a 360 degree lens may be positioned on shaft 24 to capture horizontal pixel rings, and raised and lowered in the same way. See FIG. 8.

Figure 9:
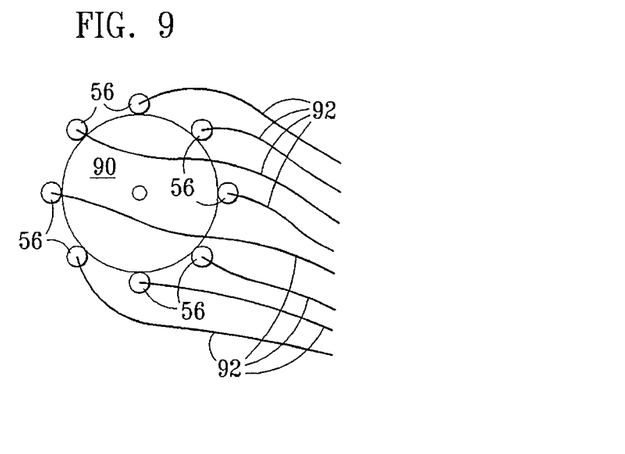
FIG. 9 is a schematic of a ring of lenses having optical fibers extending to at least one CCD, which is not shown.

Another camera 12 arrangement includes a ring mounting structure 90, having a series of lenses 56 mounted around its circumference, and the image is delivered through optical fiber 92. A linear actuator 30 is employed to focus and zoom lenses 56. See FIG. 9. The optical fiber 92 connects each lens 56 to a portion of a CCD 16 or to several CCD's 16 in a block 70. Where there are nine such lenses 56 in ring structure 90, nine pictures in $1/30$ second or 270 pictures per second can be taken. Each CCD $1/30$ second frame captures 9 EPE's. A 400×400 CCD and 2×2 EPE video can take 6000 EPE's per second.

Figure 10:
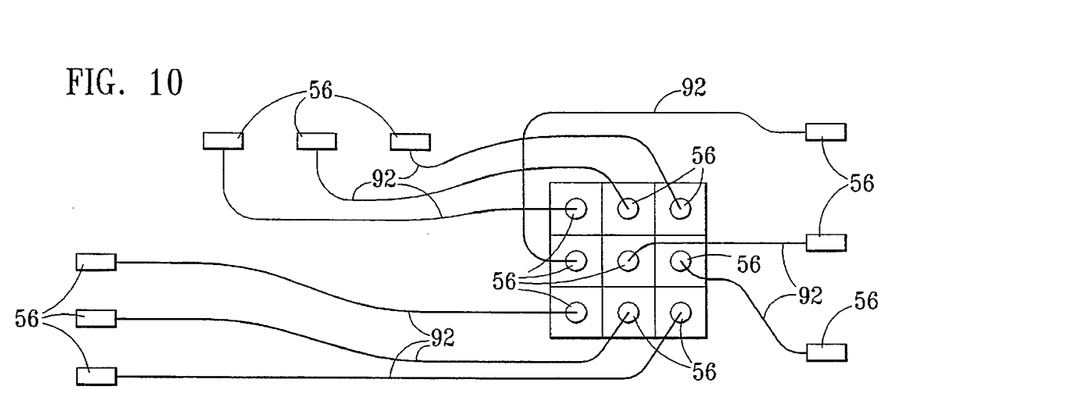
FIG. 10 is a schematic as in FIG. 9, except that the lense configuration is altered.
Figure 11:
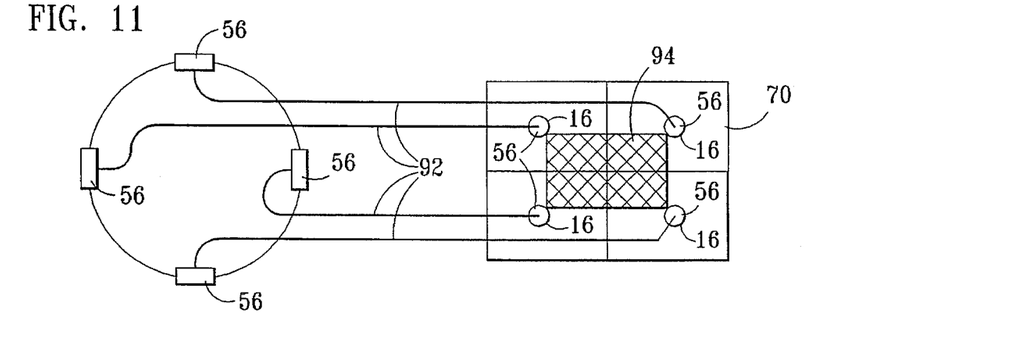
FIG. 11 is a top view of another arrangement wherein several camera lenses are positioned around a circle and optical fibers carry image information to at least one CCD device.
Figure 12:
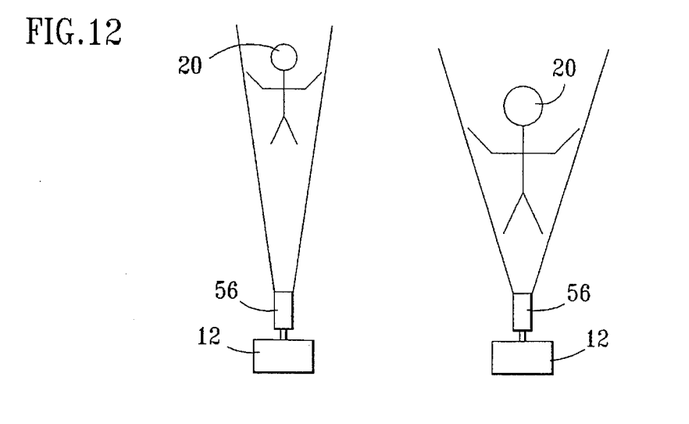
FIG. 12 is a two stage schematic of a lens enlarging a screen through a zoom function. The system will have an auto zoom which will ensure that all video images are of the correct size and proportion in relation to their positions in real space.
Figure 13:
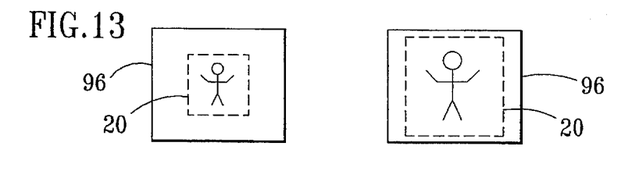
FIG. 13 is a two stage schematic illustrating how a computer can digitally enlarge a screen through a pseudo zoom function to ensure that all video images are of the correct size and proportion in real space.

Still another arrangement includes focusing lenses 56 mounted in a circular configuration and connected to lenses 56 on a CCD system. See FIG. 11. Another lens 56 configuration is shown in FIG. 10. A lens 56 configuration is selected according to the characteristics of the environment to be captured.

The system will zoom in or out to correct the proportions of the images so their size will be correct for their location in real space.

The Camera Computer

Computer 50 will provide a means for inputting and outputting data and Virtuality images. The input and output ports can be serial, parallel, SCSI, ISA, EISA or any other data transfer port, device, or combination of uni-directional and/or bi-directional ports. Disk drives, hard drives, magnetic tape systems, optical storage devices, flash ram, PCMIA, digital wireless communication links, analog wireless communication links, and any and all other such devices will be easily integrated into this system.

The VR Camera will output such data as system information, system status, Virtuality images (Ordered Range and Video Data), Range images (comprises just the ordered range data without image data), and Video images (comprises just the ordered video data without range data), and all other data the system has or can acquire. The system will be able to output this data in both industry standard formats as well as custom formats that can be programmed into the system. The system can also output real time data to a remote location for use by an operator in real time. This would allow the operator to use this system to give the effect of being on another planet, or in a hostile environment in real time.

The VR Camera will also accept input. This input can be programming instructions for camera paths, information about the environment and the camera's optimal responses to it, image overlay information or masks to create special effects and add them to the Virtuality images. The system's input can also be programs, for the purpose of changing the system's operation, to suit individual situations, to control the system, to access and manipulate the system and its data, and to access and control all system resources. The system can use artificial intelligence, neural networks, object oriented programming, as well as procedural programming to adapt to and to change its operation to suit the needs required to accomplish its task. The system can also, through the use of a wireless or wired data link, be operated in real time by an operator.

The remote operation feature will allow the system to create real time virtual reality and will effectively transport the operator to the camera location. This will enable the operator to explore foreign and/or hostile lands. The system can also record the operator's journey and play it back or analyze it later.

Method

In practicing the invention, the following method of gathering video information may be used. The range of a location in real space in said environment with respect to the apparatus is detected with a range finding device, preferably including a laser. A lens of the camera is focused to the location in real space, a zoom mechanism on the camera is operated so that the EPE captured is in correct proportion to other EPE's in the environment, the video image is captured that matches the location in real space, and the camera is rotationally moved relative to the platform with the means for rotationally moving the camera, to a series of different positions.

Figure 14:
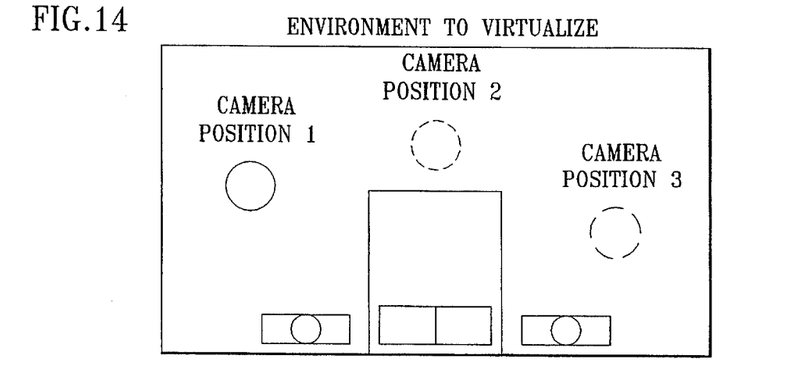
FIG. 14 is schematic of an environment to be virtualized, showing camera positions with circles, the more faded and broken circles being camera positions subsequent to that indicated by the solid circle.
Figure 15:
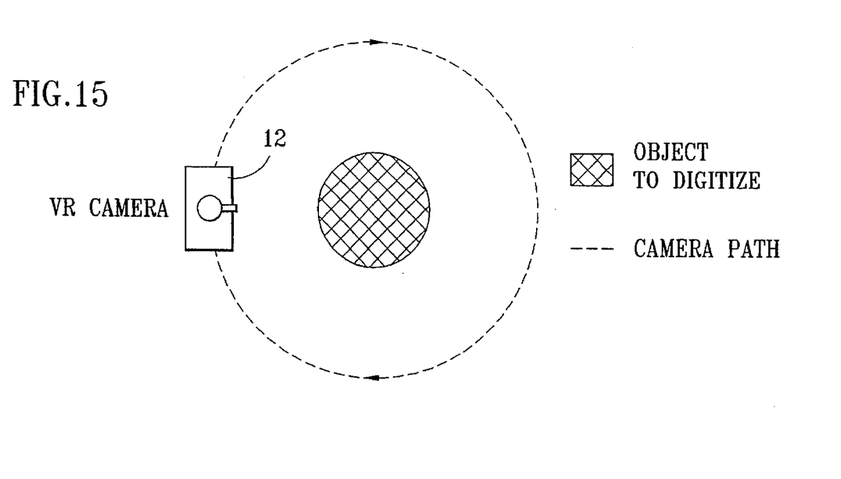
FIG. 15 is a schematic of the locus of the platform and camera as it encircles an object to be virtualized.

This method continues until all VRU's are captured. Platform 40 is moved to a new location within the environment by operation of motor driven wheels 42 to begin capturing more environmental picture elements (EPE's), until all required video information is stored. See FIG. 14. Platform 40 may circle an object to digitalize the entire object. See FIG. 15. The entire environment is then virtualized.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A method of gathering optical information within an environment using an apparatus comprising a platform mounted on a plurality of wheels on which said platform can roll, motor means for rotating at least one said wheel, circuit means for delivering power to said motor means from a power source, a switch for controlling the delivery of power to said wheels through said circuit, an essentially vertical positioning shaft mounted on said platform, a camera, structurally connected to said shaft, for gathering images in the form of environmental picture elements, range gathering means for finding the distances of said images from said camera for computation of the coordinates of said images in real space in said environment, means for rotating said camera relative to said platform for orienting said camera within said environment, camera elevation control means for translationally moving said camera along said shaft and relative to said platform for positioning said camera within said environment, computer means having programming and zoom means on said camera, comprising the steps of:

rotationally moving said camera relative to said platform with said means for rotationally moving said camera to a series of different rotational positions, and moving said camera to a series of different locations within said environment by operating said motor to rotate said at least one wheel to thereby move said platform within said environment, measuring the distance of each said image from said camera, operating said zoom means on said camera so that the environmental picture element captured is in correct proportion to other environmental picture elements in said environment, recording images in the form of environmental picture elements within said environment with said camera, storing said images within said computer means, operating said camera elevation control means for positioning said camera within said environment to achieve useful camera perspectives, storing and reconciling said images, said distances of said images from said camera and corresponding positions and orientations of said camera within said environment as data for computing said coordinates of said images in real space, combining said data to create and store in a database a topographic, three dimensional virtual image.

2. A method according to claim 1, wherein a plurality of ranges are detected simultaneously and then video image information is captured matching said ranges.

3. A method according to claim 1, wherein said range and video information for said location is captured essentially simultaneously.

4. A method of gathering optical information using an apparatus comprising a platform mounted on a plurality of wheels on which said platform can roll, motor means for rotating at least one said wheel, circuit means for delivering power to said motor means from a power source, a switch for controlling the delivery of power to said wheels through said circuit, an essentially vertical positioning shaft mounted on said platform, a camera, structurally connected to said shaft, for gathering images in the form of environmental picture elements, range gathering means for finding the distances of said images from said camera for computation of the coordinates of said images in real space in said environment, means for rotating said camera relative to said platform for orienting said camera within said environment, camera elevation control means for translationally moving said camera along said shaft and relative to said platform for positioning said camera within said environment, computer means having programming and zoom means on said camera, comprising the steps of:

gathering image information at a series of image locations in a 360 degree environment, gathering range information matching the image locations with video gathering means, storing and reconciling said images, said distances of said images from said camera and corresponding positions and orientations of said camera within said environment as data for computing said coordinates of said images in real space, combining said data to create and store in a database a topographic, three dimensional virtual image of said environment.

5. A method according to claim 4, comprising the additional step of:

directing systems operations, sensing the systems position, processing, managing, and reconciling said range and image information.

* * * * *